United States Patent
Suzuki

(10) Patent No.: US 12,271,646 B2
(45) Date of Patent: Apr. 8, 2025

(54) NON-TRANSITORY COMPUTER-READABLE MEDIUM, EDITING DEVICE AND METHOD USED BY A PRINTER

(71) Applicant: BROTHER KOGYO KABUSHIKI KAISHA, Nagoya (JP)

(72) Inventor: Yukinori Suzuki, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/392,958

(22) Filed: Dec. 21, 2023

(65) Prior Publication Data
US 2024/0211193 A1 Jun. 27, 2024

(30) Foreign Application Priority Data
Dec. 27, 2022 (JP) .................................. 2022-209146

(51) Int. Cl.
*G06F 3/12* (2006.01)

(52) U.S. Cl.
CPC .......... *G06F 3/1263* (2013.01); *G06F 3/1205* (2013.01); *G06F 3/1253* (2013.01)

(58) Field of Classification Search
CPC .... G06F 3/1262; G06F 3/1263; G06F 3/1205; G06F 3/1253; G03G 15/5029; G03G 2215/00734; H04N 1/00408; H04N 1/00413
See application file for complete search history.

(56) References Cited

U.S. PATENT DOCUMENTS

| | | | |
|---|---|---|---|
| 11,650,526 B1 * | 5/2023 | Endo .................. | G03G 15/6508 399/69 |
| 2012/0296769 A1 * | 11/2012 | Ginster, II .......... | G06Q 10/087 705/28 |
| 2014/0063517 A1 * | 3/2014 | Tachibana .......... | G03G 15/6508 358/1.12 |
| 2014/0108384 A1 * | 4/2014 | Mule ................... | H04L 41/0893 707/722 |
| 2021/0067637 A1 * | 3/2021 | Kubo ................. | H04N 1/00408 |
| 2021/0297539 A1 * | 9/2021 | Yoshida ............. | H04N 1/00395 |
| 2024/0201915 A1 * | 6/2024 | Sakamoto ............... | G06F 3/121 |

FOREIGN PATENT DOCUMENTS

| | | |
|---|---|---|
| JP | 2008-27216 A | 2/2008 |
| JP | 2018-55157 A | 4/2018 |

* cited by examiner

*Primary Examiner* — Iriana Cruz
(74) *Attorney, Agent, or Firm* — KENEALY VAIDYA LLP

(57) ABSTRACT

A non-transitory computer-readable medium stores computer-readable instructions. The computer-readable instructions cause a processor of an editing device to perform steps. The steps include selectably displaying a plurality of print medium on a display portion, each of the plurality of print medium being identified by a combination of a plurality of items. The steps include determining a high priority item from among the plurality of items. The steps include grouping the print medium for which a value is shared for the high priority item determined from among the plurality of items. The displaying includes displaying the grouped print medium in a grouped manner when displaying the plurality of print medium on the display portion.

9 Claims, 13 Drawing Sheets

| RANKING TABLE | | | | |
|---|---|---|---|---|
| | TYPE | WIDTH | LENGTH | POINTS |
| FIRTST RANK | CONTINUOUS | 24mm | NULL | 10 |
| SECOND RANK | CONTINUOUS | 12mm | NULL | 5 |
| THIRD RANK | DIE-CUT | 29mm | 90mm | 4 |
| FOURTH RANK | DIE-CUT | 29mm | 42mm | 3 |
| FIFTH RANK | DIE-CUT | 38mm | 90mm | 2 |
| SIXTH RANK | ... | ... | ... | 1 |
| SEVENTH RANK | ... | ... | ... | 1 |

FIG. 3

| | TYPE | WIDTH | LENGTH | USAGE FREQUENCY |
|---|---|---|---|---|
| | USAGE HISTORY TABLE | | | |
| FIRTST RANK | CONTINUOUS | 24mm | NULL | 700 |
| SECOND RANK | CONTINUOUS | 12mm | NULL | 500 |
| THIRD RANK | DIE-CUT | 29mm | 90mm | 300 |
| FOURTH RANK | DIE-CUT | 29mm | 42mm | 200 |
| FIFTH RANK | DIE-CUT | 38mm | 90mm | 100 |

FIG. 6

| | RANKING TABLE | | | |
|---|---|---|---|---|
| | TYPE | WIDTH | LENGTH | POINTS |
| FIRTST RANK | CONTINUOUS | 24mm | NULL | 10 |
| SECOND RANK | CONTINUOUS | 12mm | NULL | 5 |
| THIRD RANK | DIE-CUT | 29mm | 90mm | 4 |
| FOURTH RANK | DIE-CUT | 29mm | 42mm | 3 |
| FIFTH RANK | DIE-CUT | 38mm | 90mm | 2 |
| SIXTH RANK | ... | ... | ... | 1 |
| SEVENTH RANK | ... | ... | ... | 1 |

FIG. 7A

| SUM RESULT FOR TYPE | |
|---|---|
| CONTINUOUS | 10+5=15 |
| DIE-CUT | 4+3+2=9 |

FIG. 7B

| SUM RESULT FOR WIDTH | |
|---|---|
| 24mm | 10 |
| 12mm | 5 |
| 29mm | 4+3=7 |
| 38mm | 2 |

FIG. 7C

| SUM RESULT FOR LENGTH | |
|---|---|
| 90mm | 4+2=6 |
| 42mm | 3 |

FIG. 8

| | DISPLAY LIST | | |
|---|---|---|---|
| | TYPE | WIDTH | LENGTH |
| 1 | CONTINUOUS | 12mm | |
| 2 | CONTINUOUS | 24mm | |
| 3 | CONTINUOUS | 29mm | |
| 4 | CONTINUOUS | 38mm | |
| 5 | CONTINUOUS | 50mm | |
| 6 | CONTINUOUS | 54mm | |
| 7 | CONTINUOUS | 62mm | |
| 8 | DIE-CUT | 17mm | 54mm |
| 9 | DIE-CUT | 17mm | 87mm |
| 10 | DIE-CUT | 23mm | 23mm |
| 11 | DIE-CUT | 29mm | 42mm |
| 12 | DIE-CUT | 29mm | 90mm |
| 13 | DIE-CUT | 38mm | 90mm |

G1 (rows 1–7), G2 (rows 8–13)

FIG. 11

| | TYPE | WIDTH | LENGTH |
|---|---|---|---|
| \multicolumn{4}{c}{USAGE HISTORY TABLE} | | | |
| FIRST RANK | CONTINUOUS | 24mm | NULL |
| SECOND RANK | DIE-CUT | 29mm | 90mm |
| THIRD RANK | CONTINUOUS | 29mm | NULL |

.
.
.

NON-TRANSITORY COMPUTER-READABLE MEDIUM, EDITING DEVICE AND METHOD USED BY A PRINTER

REFERENCE TO RELATED APPLICATIONS

This application claims priority from Japanese Patent Application No. 2022-209146 filed on Dec. 27, 2022. The entire content of the priority application is incorporated herein by reference.

BACKGROUND ART

The present disclosure relates to a non-transitory computer-readable medium, an editing device, and a method.

In a printing system, an operator uses an editing application to perform editing of print content of a paper sheet. By activating the editing application and operating a model selection window, the operator selects a model of a printing device. On a print content editing screen, a list of paper sheet sizes that can be used with the selected model is displayed in a predetermined order. The operator selects the paper sheet size to be used from the displayed list.

SUMMARY

In the above-described editing application, since the list of the paper sheet sizes is displayed in the predetermined order, when there is a large number of sizes on the list, it is difficult for the operator to identify the paper sheet size from among the large number of paper sheet sizes arranged in the list.

Various embodiments of the general principles described herein provide a non-transitory computer-readable medium, an editing device, and a method contribute to a user to easily identify a desired print medium, by improving readability.

Embodiments herein provide a non-transitory computer-readable medium storing computer-readable instructions that, when executed by a processor of an editing device configured to edit print data used by a printer, cause the processor to perform steps. The steps include displaying a selection screen on a display portion. The selection screen including a list of a plurality of print medium to be selected. Each of the plurality of print medium is identified by a combination of a plurality of items. The steps include determining a high priority item from among the plurality of items. The steps include grouping the print medium for which a value is shared for the high priority item determined from among the plurality of items. The displaying includes displaying the selection screen in a state in which the grouped print medium is displayed in a grouped manner on the list.

By performing the above-described steps, when setting the print medium corresponding to the print data, of the plurality of print medium that are the target of the setting, the group of the print medium including the high priority item is displayed in the grouped manner on the display portion. Thus, by improving readability, the non-transitory computer-readable medium can enable a user to easily identify a desired print medium.

Embodiments herein also provide an editing device configured to edit print data used by a printer. The editing device includes a processor and a memory. The memory stores computer-readable instructions that, when executed by the processor, cause the processor to perform processes. The processes include displaying a selection screen on a display portion of the editing device. The selection screen includes a list of a plurality of print medium. Each of the plurality of print medium is identified by a combination of a plurality of items. The processes include determining a high priority item from among the plurality of items. The processes include grouping the print medium for which a value is shared for the high priority item determined from among the plurality of items. The displaying includes displaying the selection screen in a state in which the grouped print medium is displayed in a grouped manner on the list.

The editing device achieves the same effects as those of the above-described non-transitory computer-readable medium.

Embodiments herein also provide a method for controlling an editing device configured to edit print data used by a printer. The method includes steps. The steps include determining a high priority item from among a plurality of items. A combination of the plurality of items identifying each of a plurality of print medium. The steps include grouping the print medium having a same value for the determined high priority item. The steps include displaying a selection screen on a display portion of the editing device. The selection screen includes a list of the plurality of print medium to be selected. The grouped print medium is displayed in a grouped manner on the list.

The method achieves the same effects as those of the above-described non-transitory computer-readable medium.

BRIEF DESCRIPTION OF DRAWINGS

FIG. 3 is a table showing a usage history table.
FIG. 6 is a table showing print medium ranked highly in the usage history table, and points assigned to the print medium.
FIG. 7A to FIG. 7C are tables showing sum results of the points for each of items.
FIG. 8 is a table showing a display list.
FIG. 11 is a table showing a usage history table.

DESCRIPTION

Figure 1:
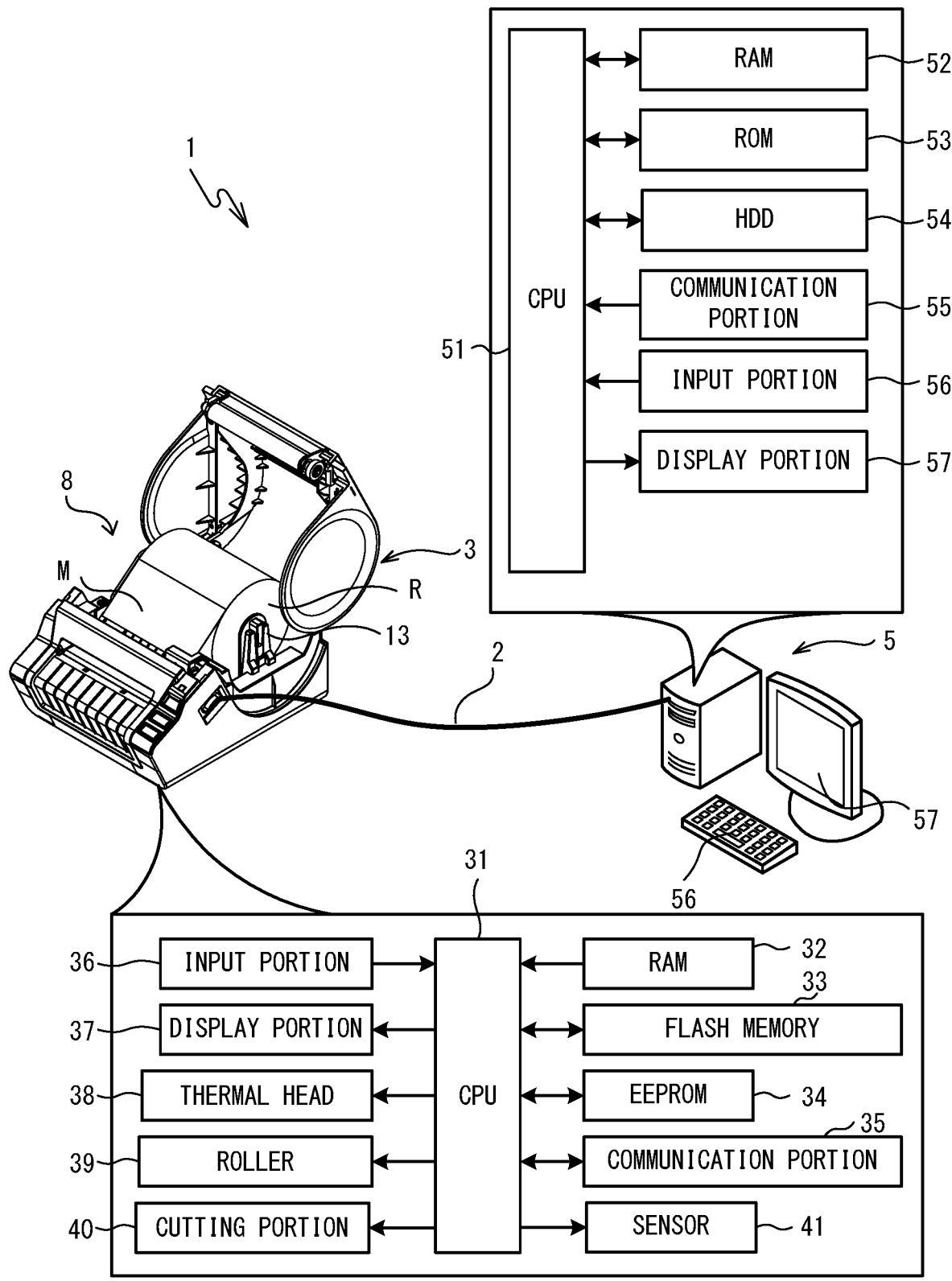
FIG. 1 is a view showing a printing system.

An embodiment of the present disclosure will be described with reference to the drawings. An overview of a printing system 1 will be described with reference to FIG. 1. The printing system 1 is provided with a printer 3 and a PC 5. The printer 3 and the PC 5 are connected via a cable 2, and can perform communication with each other. A cassette 8 is mounted to the printer 3. A holding portion 13 of the cassette 8 holds a roll sheet R on which a print medium M is wound. In the print medium M, a heat-sensitive paper is adhered to a release paper by an adhesive.

The printer 3 feeds out the print medium M from the cassette 8, and performs printing using a thermal head 38. Further, the printer 3 cuts the printed print medium M using a cutting portion 40. In this way, the printer 3 can form a label on which characters, symbols, and the like are printed. Hereinafter, data for printing the label will be referred to as "print data."

The PC 5 is a general-purpose personal computer. The PC 5 can execute various programs. For example, when a program is executed by the PC 5, a user can edit the print data. The PC 5 transmits the print data created by the user to the printer 3 via the cable 2. The printer 3 performs the printing based on the print data transmitted from the PC 5. In this way, the label based on the print data is created.

The electrical configuration of the printer 3 will be described. The printer 3 is provided with a CPU 31, a RAM 32, a flash memory 33, an EEPROM 34, a communication portion 35, an input portion 36, a display portion 37, the thermal head 38, a roller 39, the cutting portion 40, and a sensor 41. The CPU 31 controls the printer 3. The CPU 31 is electrically connected to the RAM 32, the flash memory 33, the EEPROM 34, the communication portion 35, the input portion 36, the display portion 37, the thermal head 38, the roller 39, the cutting portion 40, and the sensor 41.

The RAM 32 stores various temporary data. The various programs executed by the CPU 31 for controlling the printer 3, and the print data received from the PC 5 are stored in the flash memory 33. Print dot pattern data for editing the print data is categorized for each of fonts and sizes, and stored in the EEPROM 34.

The communication portion 35 is a controller for performing communication with the PC 5. The input portion 36 is a keyboard. The display portion 37 is an LCD. The thermal head 38 generates heat in accordance with a signal from the CPU 31, and performs the printing on the print medium M. The roller 39 is a feed roller for feeding the print medium M.

The cutting portion 40 cuts the print medium M on which the printing has been performed by the thermal head 38. The sensor 41 detects information about the cassette 8 mounted to the printer 3. The information about the cassette 8 includes information about the type of the cassette, for example. A detection result by the sensor 41 is transmitted to the CPU 31.

The electrical configuration of the PC 5 will be described. The PC 5 is provided with a CPU 51, a RAM 52, a ROM 53, an HDD 54, a communication portion 55, an input portion 56, and a display portion 57. The CPU 51 controls the PC 5. The CPU 51 is electrically connected to the RAM 52, the ROM 53, the HDD 54, the communication portion 55, the input portion 56, and the display portion 57.

The RAM 52 temporarily stores various data. The ROM 53 stores a BIOS and the like. Various programs executed by the CPU 51 for controlling the PC 5, an OS, and the like, are stored in the HDD 54.

The communication portion 55 is a controller for performing communication with the printer 3. The input portion 56 includes a keyboard and a pointing device, such as a mouse, a touch pen, or the like. The display portion 57 is an LCD. The display portion 57 can display an editing window 570 for editing the print data.

Figure 2:
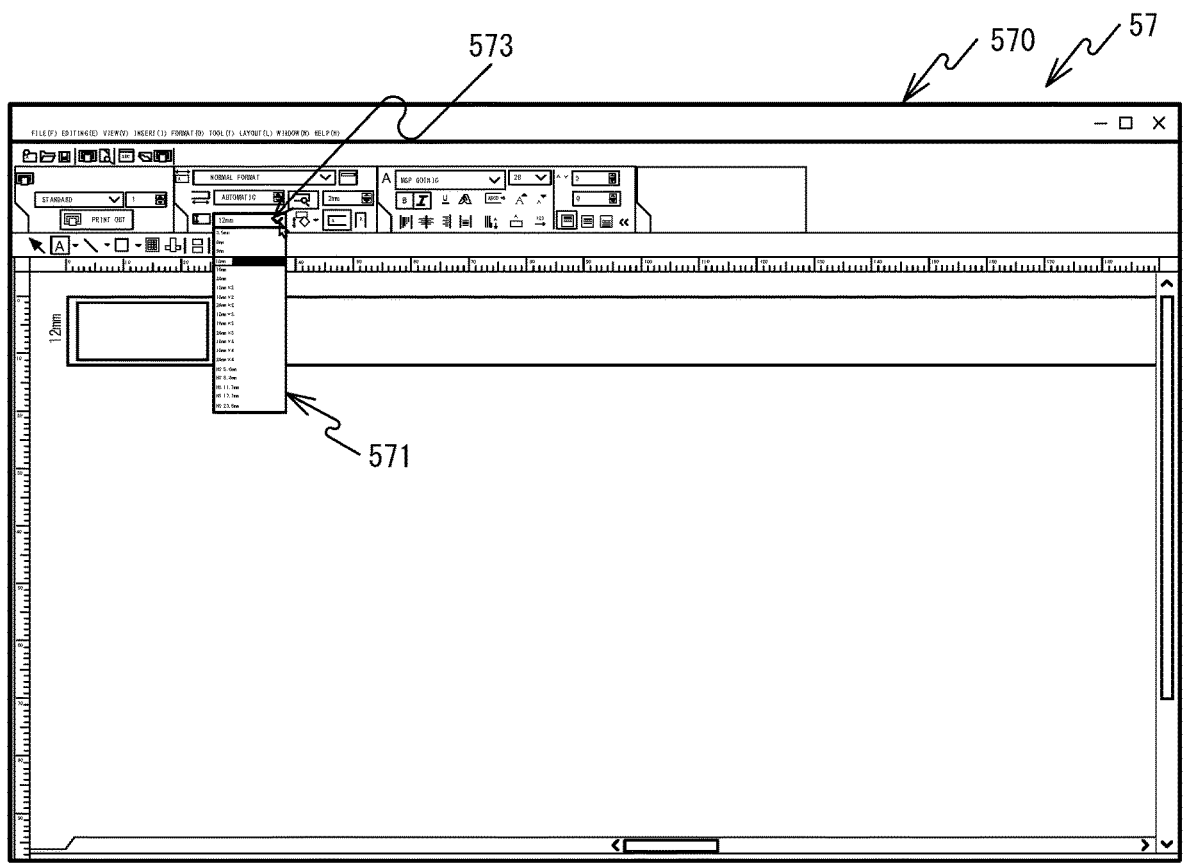
FIG. 2 is a view showing an editing window.

A simple description will be made of an editor, with reference to FIG. 2. When editing the print data, the user activates the editor. The editing window 570 is displayed on the display portion 57. The user edits the print data on the editing window 570. For example, when selecting the print medium M, the user clicks a display button 573 displayed in an upper portion of the editing window 570. In this way, a selection screen 571 for selecting the print medium M is displayed as a pull down. A list of the print medium M that can be printed using the printer 3 is displayed on the selection screen 571. The user selects one of the print medium M.

The user edits the text, the layout, and the like of the print data by operating the input portion 56. When the editing of the print data is complete, the user clicks a save button in the editing window 570, for example. When the save button is clicked, the print data is saved to the HDD 54 of the PC 5.

The user can print the print data when the print medium M matching the stored print data has been mounted to the printer 3.

A usage history table will be described with reference to FIG. 3. The usage history table displays usage history information of the print medium M printed using the printer 3. The usage history table is stored in the flash memory 33 of the printer 3. The usage history table is updated as needed by storage processing to be described later that is performed by the printer 3. The usage history table is used when determining a display order of the print medium M when displaying the selection screen 571.

In the usage history table, a usage frequency for each of the print medium M is stored and the print medium M are sorted in descending order of usage frequency. The print medium M ranked first to fifth are respectively used "700," "500," "300," "200," and "100" times. Each of the print medium M is identified using 3 items ("Type," "Width," and "Length"). The usage history table stores respective values for the "Type," "Width," and "Length" for each of the print medium M. For example, the values for the "Type," "Width," and "Length" for the print medium M ranked first in order are identified by "Continuous" "24 mm." and "NULL."

Figure 4:
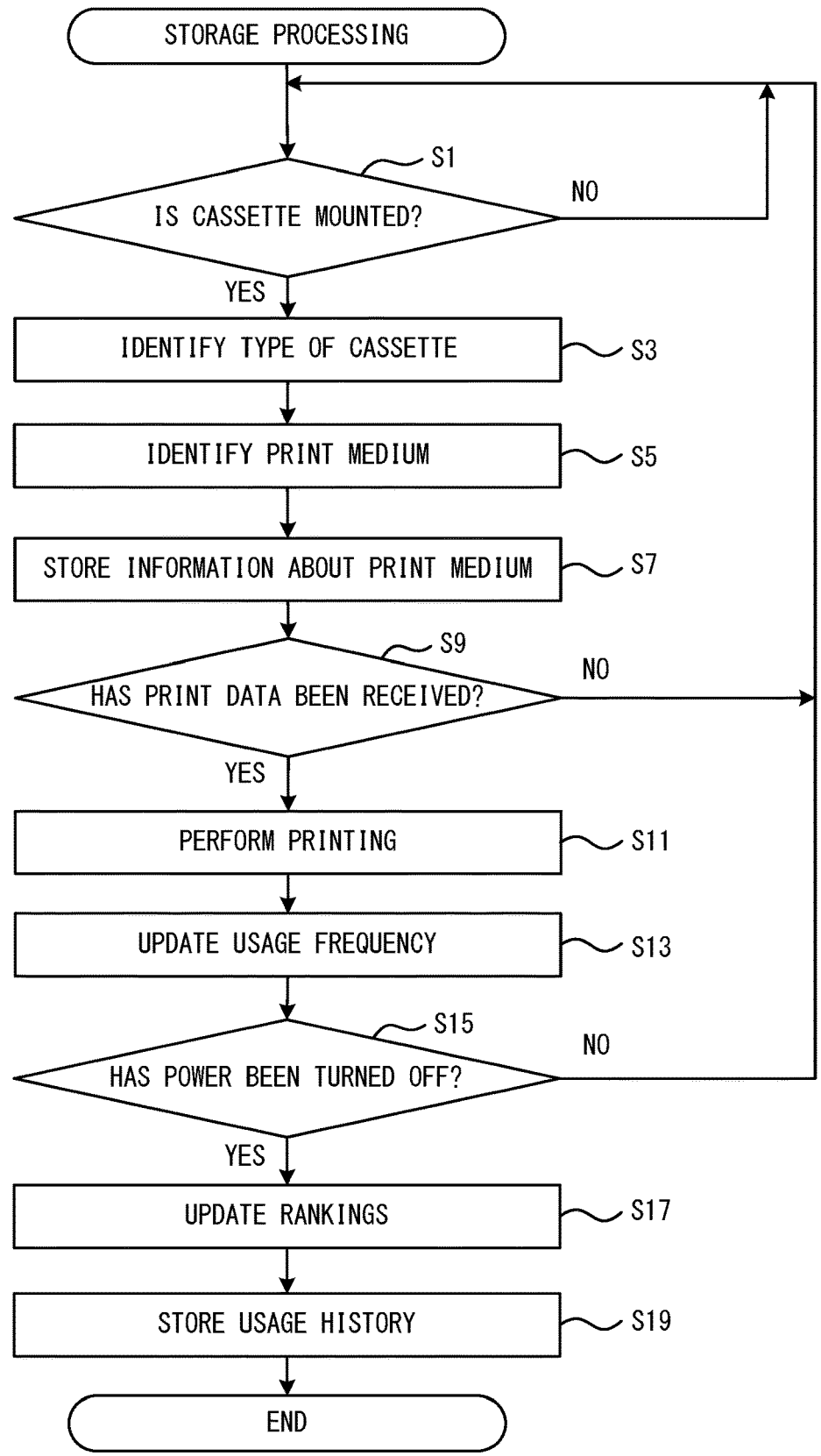
FIG. 4 is a flowchart of storage processing.

The storage processing performed by the printer 3 will be described with reference to FIG. 4. When a power source to the printer 3 is turned on, the CPU 31 reads out a program from the flash memory 33 and performs the storage processing. When the storage processing is performed, the CPU 31 determines whether or not the cassette 8 is mounted (step S1). When it is determined that the cassette 8 is not mounted (no at step S1), the CPU 31 returns the processing to step S1 and stands by.

When it is determined that the cassette 8 is mounted (yes at step S1), the CPU 31 identifies the type of the cassette 8 mounted to the printer 3, on the basis of an output result from the sensor 41 (step S3). The CPU 31 identifies the print medium M mounted to the printer 3 on the basis of the type of the identified cassette 8 (step S5). The CPU 31 stores information about the identified print medium M in the flash memory 33 (step S7).

The CPU 31 determines whether or not the print data has been received from the PC 5 (step S9). When it is determined that the print data has not been received from the PC 5 (no at step S9), the CPU 31 returns the processing to step S1. When it is determined that the print data has been received (yes at step S9), the CPU 31 performs the printing based on the print data (step S11). The CPU 31 updates the "Usage frequency" of the print medium M for which the printing has been performed (step S13). For example, when the printing has been performed using the print medium M of "Continuous" and "24 mm," the value of the "Usage frequency" of the print medium M ranked first in the usage history table shown in FIG. 3 is incremented by 1 from "699" and is updated to "700."

The CPU 31 determines whether or not the power source of the printer 3 has been turned off (step S15). When it is determined that the power source of the printer 3 has not been turned off (no at step S15), the CPU 31 returns the processing to step S1. When it is determined that the power source of the printer 3 has been turned off (yes at step S15), the CPU 31 updates the rankings of the print medium M in the usage history table (step S17). In this case, the "Usage frequency" is sorted in descending order. The CPU 31 stores the updated usage history table in the flash memory 33 (step S19). In this case, for example, the usage history table shown in FIG. 3 is stored. The CPU 31 ends the processing.

Figure 5:
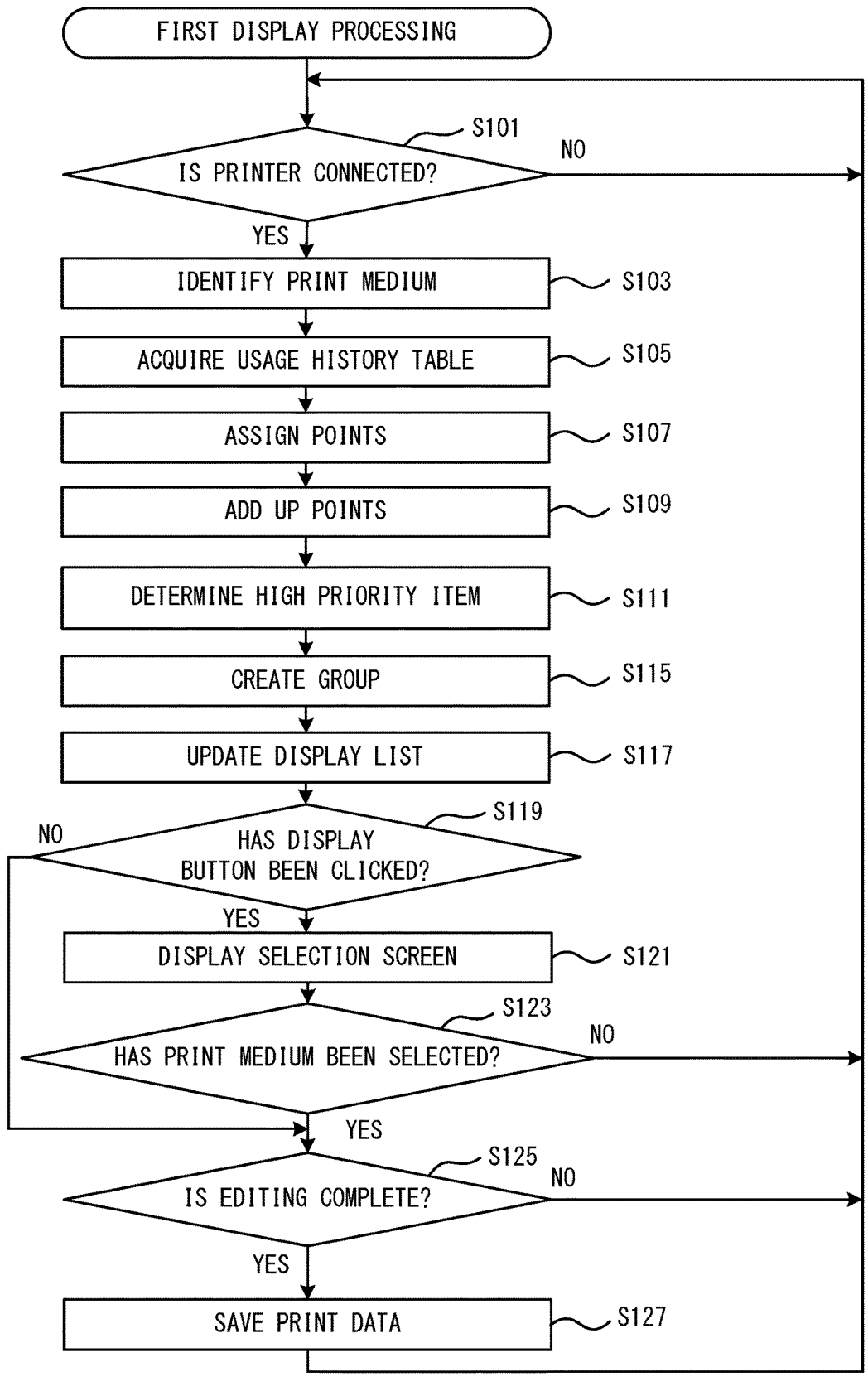
FIG. 5 is a flowchart of first display processing.

First display processing performed by the PC 5 will be described with reference to FIG. 5. When the user activates the editor in order to edit the print data, the CPU 51 reads out a program stored in the HDD 54 and performs the first display processing. When the first display processing is performed, the CPU 51 determines whether or not the printer 3 is connected to the PC 5 (step S101). When it is determined that the printer 3 is not connected to the PC 5 (no at step S101), the CPU 51 returns the processing to step S101.

When it is determined that the printer 3 is connected to the PC 5 (yes at step S101), the CPU 51 refers to the flash memory 33 of the printer 3, and identifies the print medium M mounted to the printer 3 (step S103). For example, the print medium M identified by the values "Die-cut," "23 mm," and "23 mm" of each of the items is identified. The CPU 51 acquires the usage history table from the printer 3 via the cable 2 (step S105). In this case, the usage history table shown in FIG. 3 is acquired, for example. Note that, in the present embodiment, when the CPU 51 determines a "high priority item" to be described later, the CPU 51 targets the first to fifth ranked print medium M.

Based on the acquired usage history table, the CPU 51 assigns "points," which correspond to the usage frequency attributed to each of the print medium M, to the values of the plurality of items of the corresponding print medium M (step S107).

As shown in FIG. 6, for example, the "points" corresponding to the ranking are allocated to each of the print medium M. For example, "10 points," "5 points," "4 points," "3 points," and "2 points," are respectively allocated to the print medium M ranked first to fifth. "1 point" is allocated to the print medium M from the ranked sixth. Note that "0 points" are allocated to the print medium M that has not once been used.

For example, for the print medium M that is ranked first, "10 points" are assigned to the values "Continuous" and "24 mm" of each of the items. Further, for the print medium M that is ranked second, "5 points" are assigned to the values "Continuous" and "12 mm" of each of the items. For the print medium M that are ranked third and below also, in a similar manner, "points" are assigned to the values of each of the items. Note that "points" are not to the value "NULL" of each of the items. Further, in the present embodiment, the assignment of the "points" is targeted at the print medium M ranked first to fifth, but the assignment of the "points" may be applied to all the print medium M.

The CPU 51 adds up all of the "points" assigned to the values that are shared, for each of the plurality of items of the plurality of print medium M (step S109).

In the present embodiment, the points are added up using the print medium M ranked from first to fifth. As shown in FIG. 7A, in the item "Type," the "points" assigned to "Continuous" are added up. More specifically, the "10 points" assigned to "Continuous" in in the print medium M ranked first, and the "5 points" assigned to "Continuous" in the print medium M ranked second are added up. The sum result is "15 points." In a similar manner, the sum result relating to "Die-cut" is "9 points," obtained by adding up the "4 points," "3 points," and "2 points" respectively assigned to the value "Die-cut" of the item "Type" ranked third to fifth.

As shown in FIG. 7B, for the value "24 mm" of the item "Width," "10 points" are assigned to "24 mm" ranked first, and there are no values for the other items of "24 mm." Thus, the sum result is "10 points." In a similar manner, for the value "12 mm" of the item "Width," the sum result is "5 points." For the value "29 mm" of the item "Width," "4 points" assigned to the print medium M ranked third and "3 points" assigned to the print medium M ranked fourth are added up. The sum result is thus "7 points." For the value "38 mm" of the item "Width," the sum result is "2 points."

Figure 7C:
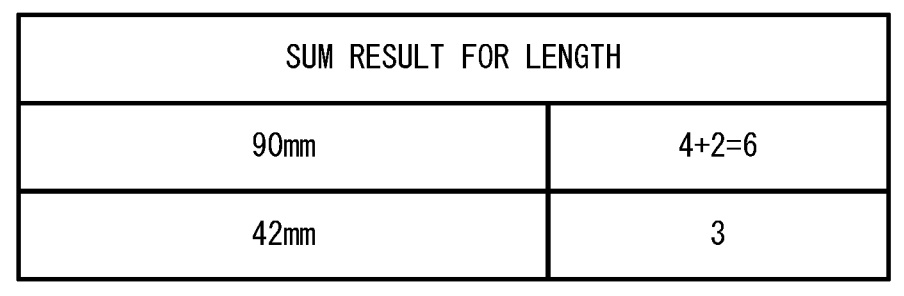

As shown in FIG. 7C, the value "NULL" of the item "Length" is not counted. For the value "90 mm" of the item "Length," "4 points" assigned to the print medium M ranked third and "2 points" assigned to the print medium M ranked fifth are added up. The sum result is thus "6 points." For the value "42 mm" of the item "Length," the sum result is "3 points."

When the adding up of each of all the items is complete, based on the acquired usage history table, the CPU 51 determines which, of the plurality of items, is a high priority item (step S111). By determining the high priority items, the CPU 51 can identify the print medium M having a high likelihood of selection by the user.

In this case, the CPU 51 determines, as the high priority item, the item related to the highest value of the added up "points." First, the "15 points" of "Continuous" is identified (refer to FIG. 7A). Next, the item "Type" related to the item value "Continuous" is determined to be the high priority item.

Of the plurality of print medium M, the CPU 51 creates a group of the print medium M that share the value of the determined high priority item (step S115). In this case, for example, the print medium M including the value "Continuous" of the item "Type" are grouped together. Further, the print medium M including the value for "Type" other than "Continuous" are also respectively grouped together.

The CPU 51 updates a display list (step S117). For example, a display list shown in FIG. 8 is updated. Note that the display list shown in FIG. 8 does not show the print medium M below the rank of 13, for convenience of explanation.

As shown in FIG. 8, when it is determined that the high priority item is "Type," for example, a group G1 is displayed, in a grouped manner, at the top of the list. The group G1 is formed by grouping together "Continuous" which has the highest number of added up points of the item "Type." More specifically, for example, the print medium M having the item value "Continuous" are displayed in the grouped manner from "first" to "seventh" on the list. The print medium M having the item value "Continuous" are arranged in order from the top in a predetermined order. The predetermined order is an order of increasing "Width." Note that the grouped print medium M include the print medium M for which the usage frequency is "first" and "second" (refer to FIG. 3).

On the other hand, the print medium M identified using the values other than "Continuous" for the item "Type" are, for example, grouped as the print medium M identified by the value "Die-cut." A group G2 is configured by the print medium M including the value "Die-cut" for "Type." For example, in the print medium M from the rank of 8 and below, the "Die-cut" print medium M are arranged from the top in the predetermined order. Note that the predetermined order is the order of increasing "Width," for example. Further, when the value of the "Width" is shared, the print medium M are arranged in an order of increasing "Length."

The CPU 51 determines whether or not the display button 573, on the selection screen 571, has been clicked (step S119). When it is determined that the display button 573 has not been clicked (no at step S119), the CPU 51 advances the processing to step S125. On the other hand, when it is determined that the display button 573 has been clicked (yes at step S119), the CPU 51 displays the selection screen 571 on the display portion 57 (step S121).

Figure 9:
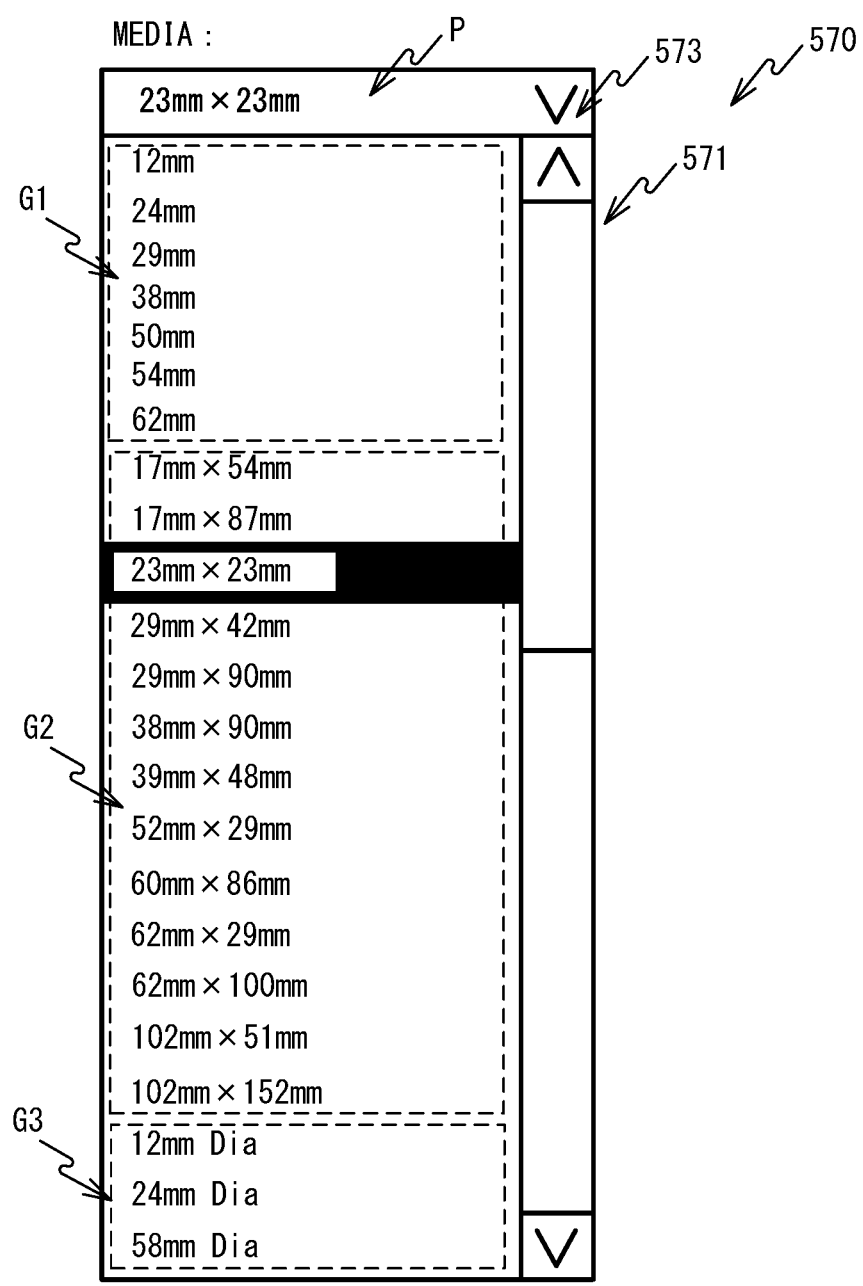
FIG. 9 is a view showing a print medium selection screen.

In this case, for example, the selection screen 571 shown in FIG. 9 is displayed. Based on the updated display list, the selection screen 571 displays the print medium M that can be used by the printer 3 such that the print medium M can be selected. The group G1 is displayed in the grouped manner at the top of the selection screen 571. Further, the group G2 and a group G3 formed by grouping the values of the other items are displayed in the grouped manner below the group G1, for example. For example, the groups G2 to G3 are arranged in order from the top. In other words, of the groups G1 to G3 in which the print medium M are grouped, the display portion 57 displays, in the grouped manner, the print medium M of the group G1, which is the group for which the value of the high priority item is "Continuous" to be higher in the list than the print medium M of the other groups G2 to G3.

In the group G1, each of the print medium M are displayed in the predetermined order. Thus, in the group G1, the grouped print medium M are displayed in the grouped manner in the predetermined order, regardless of whether or not a second high priority item has been determined. This also applies to the other groups G2 to G3. This type of display is also referred to as displaying the print medium M grouped into the groups G1 to G3 in a predetermined order in the group units.

Here, when the print medium M identified by the item values "Die-cut," "23 mm," and "23 mm" is housed in the printer 3, the display portion 57 displays, in white characters on a black background, a character string "23 mm×23 mm." Further, the character string "23 mm×23" mm is displayed in a field P at the top of the selection screen 571. Thus, the selection screen 571 displays, in the grouped manner, the grouped print medium M that can be selected, in a state in which the print medium M mounted in the printer 3 is selected.

By scrolling the selection screen 571 of the display portion 57 up and down, for example, the user views the print medium M that can be used in the printer 3. In this case, the print medium M including the high priority item of the group G1 are displayed in the grouped manner at the top of the list, and thus, the user can easily identify the desired one print medium M.

The CPU 51 determines whether or not the one print medium M has been selected from among the plurality of print medium M displayed on the selection screen 571 (step S123). When it is determined that the one print medium M has not been selected (no at step S123), the CPU 51 returns the processing to step S101. When it is determined that the one print medium M has been selected (yes at step S123), the CPU 51 determines whether or not the editing of the print data is complete (step S125). When it is determined that the editing of the print data is not complete (no at step S125), the CPU 51 returns the processing to step S101.

For example, when a save button in the editing window 570 has been clicked by the user, it is determined that the editing of the print data is complete (yes at step S125), and the CPU 51 saves the print data in the HDD 54 of the PC 5 (step S127). The CPU 51 returns the processing to step S101.

For example, a case will be described in which the value of the item having the highest number of "points" is "29 mm," and the item "Width" is the high priority item. In this case, it is assumed the print medium M having the value "29 mm" are displayed in the predetermined order, not at the top of the list. In other words, in this example, "Width" is determined to be the high priority item, and the print medium M sharing the "Width" value are grouped. The display order does not list the group of "29 mm" higher than the other groups of the other values of "Width," but performs the display in the predetermined order, that is, in the order of increasing width. In other words, the print medium M are displayed in an order of a group of the print medium M for which the "Width" is "12 mm," a group of the print medium M for which the "Width" is "17 mm," a group of the print medium M for which the "Width" is "23 mm," a group of the print medium M for which the "Width" is "24 mm," a group of the print medium M for which the "Width" is "29 mm," and so on.

As described above, the CPU 51 identifies the high priority item from among the plurality of items of "Type," "Width," and "Length." The CPU 51 groups together the print medium M having the shared values for the determined high priority item, among the plurality of print medium M. When the CPU 51 displays the plurality of print medium M on the display portion 37, the CPU 51 displays the grouped print medium M in the grouped manner.

In the above printing system 1, when setting the print medium M corresponding to the print data, of the plurality of print medium M that are the target of the setting, the print medium M including the high priority item are displayed in the grouped manner as the group G1 on the display portion 37. Thus, by improving the readability, the program can enable the user to easily identify the desired print medium M.

Of the groups G1 to G3 of the grouped print medium M, the CPU 51 displays, in the grouped manner, the print medium M of the group G1, which is the group for which the value of the high priority item is "Continuous" to be higher position in the list than the print medium M of the other groups G2 to G3. Since the grouped print medium M are displayed in the grouped manner higher in the list, the user easily identifies the desired print medium M.

Of the grouped print medium M, when the high priority item is "Width," the CPU 51 performs the display in a predetermined order in units of groups for which the "Width" value is shared. Thus, the user can efficiently identify the desired print medium M by viewing the grouped print medium M in the predetermined order.

The CPU 51 displays the grouped print medium M in the grouped manner, in the predetermined order within the group. The grouped print medium M are displayed, in the grouped manner, in the predetermined order within the group. Thus, the user can efficiently identify the desired print medium M using the predetermined order.

The CPU 51 acquires the usage history table from the printer 3. The CPU 51 determines the high priority item based on the print medium M for which the usage frequency is high, of the usage history table acquired from the printer 3. Based on the print medium M for which the "Usage frequency" is high in the printer 3, the CPU 51 can group the print medium M using the values of the high priority item.

The CPU 51 identifies the print medium M mounted to the printer 3. The CPU 51 displays the grouped print medium M in the grouped manner, such that the print medium M can be selected, in the state in which the identified print medium M is selected. The user can easily ascertain the print medium M that is mounted to the printer 3 by checking the display portion 37, and can also select the print medium M of the high priority item.

Based on the acquired usage history table, the CPU 51 assigns the "points" corresponding to the "Usage frequency" and attributed to each of the print medium M, to the values of the plurality of items of the corresponding print medium M. The CPU 51 adds up all of the "points" assigned to the shared value within each of the plurality of items of the plurality of print medium M. The CPU 51 determines the item related to the highest value of the added "points" to be the high priority item. It is possible to determine the high priority item based on the "points" corresponding to the usage frequency, and thus, the user can efficiently select the desired print medium M.

Second display processing according to the present disclosure will be described with reference to FIG. 10 and FIG. 11. Hereinafter, a description of the processing that is the same as that of the above-described first display processing will be omitted or simplified. In the second display processing, a method of determining the high priority item is different.

Figure 10:
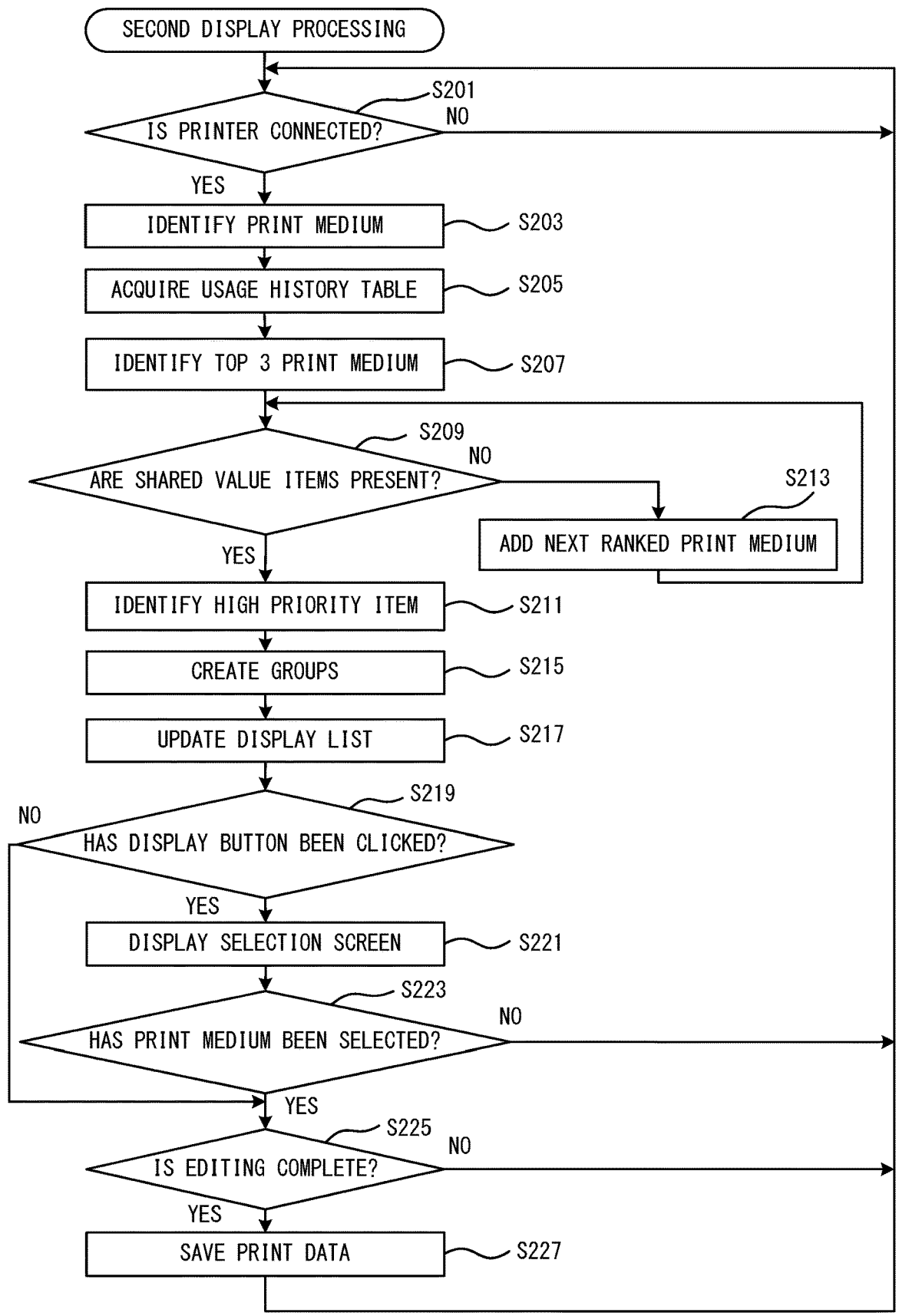
FIG. 10 is a flowchart of second display processing.

As shown in FIG. 10, the CPU 51 reads out a program stored in the HDD 54, and performs the second display processing. When the second display processing is performed, the CPU 51 performs processing at S201, S203, and S205. Note that the processing at S201 to S205 is the same processing as at step S101 to step S105 of the first display processing.

The CPU 51 identifies three print medium M for which the usage frequency is highest, based on the acquired usage history table (step S207). In this case, for example, the usage history table shown in FIG. 11 is identified. The CPU 51 determines whether or not at least two print medium M from among the identified three print medium M have shared values among the plurality of items (step S209). When it is determined that there is the item having the shared value among the plurality of items (yes at step S209), the CPU 51 determines the item having the shared value, among the plurality of items, to be the high priority item (step S211).

In the example of the usage history table shown in FIG. 11, in the print medium M that are ranked first and third, the value of the item "Continuous" is identified. Further in the items that are ranked second and third, the value of the item "29 mm" is identified. In this case, the value of the item of the print medium M ranked first is used as a priority. The CPU 51 determines the item "Type" relating to "Continuous" to be the high priority item.

On the other hand, when it is determined that there is no item having the shared value, among the plurality of items (no at step S209), the CPU 51 refers to the usage history table and adds the next ranked print medium M (step S213). In this case, for example, the print medium M that is ranked fourth is added as a candidate. Subsequently, at step S209, the CPU 51 performs the processing targeting the top four ranked print medium M. Thus, the CPU 51 adds the lower ranked print medium M as the candidate until the shared item value is identified, and determines the item having the shared value to be the high priority item. Thereafter, the CPU 51 performs processing from step S215 to S227. Note that the processing from step S215 to step S227 is the same as the processing from step S115 to step S127 of the first display processing, respectively.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

The above-described embodiments can be further modified as described below. Each of modified examples described below may be combined insofar as no contradictions arise. In the above-described embodiments, the printing system 1 is provided with the PC 5 but the configuration is not limited thereto. For example, the PC 5 may be configured by a device having a display portion, such as a smartphone, a tablet or the like.

In the above-described embodiments, the printer 3 and the PC 5 are connected via the cable 2, but the configuration is not limited thereto. For example, the printer 3 and the PC 5 may communicate via wireless communication without using the cable 2.

In the above-described embodiments, the usage history table is acquired from the printer 3, but the configuration is not limited thereto. For example, the usage history table may be saved in cloud storage, and the PC 5 may acquire the usage history table by accessing the cloud. Further, the PC 5 may store the most recently acquired usage history table in the HDD 54, the flash memory 33, or the like, and may use that usage history table.

In the above-described embodiments, the PC 5 performs the processing from step S107 to step S117, but the configuration is not limited thereto. For example, at least some of the processing from step S107 to step S117 may be performed on the printer 3 side.

In the above-described embodiments, the high priority item is determined using the "points" but the configuration is not limited thereto. For example, using the "usage frequency" at which each of the print medium M are used, the "usage frequency" may be assigned to the values of each of the items. In this case, the "usage frequencies" are added up, in place of the "points." Based on this sum result, the high priority item is determined. Further, the high priority item maybe set by the user in advance. In this case, for example, in the processing at step S111, the item set by the user may be read and used for the determination.

In the above-described embodiments, the high priority item is determined taking the print medium M ranked first to fifth in the usage history table as the targets of the determination, but the configuration is not limited thereto. For example, the print medium M ranked sixth and below may also be the targets of the determination. The print medium M ranked first to third may be the targets of the determination. The targeted print medium M may be set as applicable. All of the print medium M that have been used in the past may be the targets of the determination, or the print medium M used within a predetermined time period (within the last month, for example) may be the targets of the determination.

In the above-described embodiments, the "points" shown in FIG. 6 are allocated to each of the print medium M, but the configuration is not limited thereto. The "points" allocated to each of the print medium M may be changed as applicable. For example, the "points" for the first ranking may be more than, or may be less than the "10 points." The difference with the second ranking may be more than, or may be less than the "5 points."

In the above-described embodiments, when the high priority item is "Type" ("Continuous" or "Die-cut"), the groups G1 to G3 are displayed in order, and when the high priority item is "Width" or "Length," the display is performed in the predetermined order, but the configuration is not limited thereto. Even when the high priority item is "Type" ("Continuous" or "Die-cut"), it is sufficient that the group G1 be displayed in the grouped manner, and the group G1 may be displayed lower than the other groups G2 and G3. When the order of display of the groups G1 to G3 is predetermined, the groups G1 to G3 may be arranged in the predetermined order. Further, even when the high priority item is "Width," or "Length," the group for which the "points" of the values of other items are high may be displayed higher on the list Further, in the above-described embodiments, the groups are formed using the values of the high priority item, and the display order of the print medium M within the group is the predetermined order, but the configuration is not limited thereto. For example, between the processing at step S111 and step S115, a second high priority item may be determined, and the display order may be determined such that the print medium M within the group G1, for example, are displayed with the print medium M having the high number of points for the value of the second high priority item being displayed at the top of the list.

In the above-described embodiments, the selection screen 571 displays the print medium M mounted to the printer 3, and also displays the grouped print medium M, but the configuration is not limited thereto. A display format of the print medium M mounted to the printer 3 may be changed as applicable. Further, the print medium M mounted to the printer 3 need not necessarily be selected by the white characters on the black background on the selection screen 571. Information about the print medium M mounted to the printer 3 may be displayed only in the uppermost field P on the selection screen 571. The display format may be changed as applicable.

In the above-described embodiments, instead of the CPUs 31 and 51, a microcomputer, an application specific integrated circuit (ASIC), a field programmable gate array (FPGA), or the like may be used as a processor. The storage processing, and the first and second display processing may be performed as distributed processing by a plurality of processors. The programs may be downloaded from a server connected to the Internet (not shown in the drawings), for example (in other words, may be transmitted as signals), and may be stored in a non-volatile memory. In this case, the programs may be saved in a non-transitory storage medium, such as an HDD or the like, provided in the server.

What is claimed is:

1. A non-transitory computer-readable medium storing computer-readable instructions that, when executed by a processor of an editing device configured to edit print data used by a printer, cause the processor to perform steps comprising:
   displaying a selection screen on a display portion, the selection screen including a list of a plurality of print medium to be selected, each of the print medium being identified by a combination of a plurality of items;
   determining a high priority item from among the plurality of items; and
   grouping the print medium, into groups, for which a value is shared for the high priority item determined from among the plurality of items,
      wherein the displaying includes displaying the selection screen in a state in which the grouped print medium is displayed in a grouped manner, based on the groups, on the list;
      wherein the displaying includes displaying, in the grouped manner, the selection screen in a state in which the grouped print medium is displayed in a predetermined order within each of the groups, the predetermined order being based on width of the print medium;
   wherein the computer-readable instructions further cause the processor to perform a step comprising:
   acquiring a usage history from the printer, and
   the determining includes determining the high priority item based on the print medium having a higher usage frequency, of the usage history acquired from the printer; and
   wherein the computer-readable instructions further cause the processor to perform steps comprising:
      assigning a point, based on the acquired usage history, to a value of the plurality of items of the corresponding print medium, the point corresponding to the usage frequency and being attributed to each of the print medium; and
      adding up the points assigned to the value shared among the plurality of items of the plurality of print medium, and
   the determining includes determining the item relating to the value for which a total of the added up points is highest to be the high priority item.

2. The non-transitory computer-readable medium according to claim 1, wherein
   the displaying includes, of the groups of the grouped print medium, displaying the selection screen in a state in which, in the grouped manner, the print medium of a group, of the groups, for which the value of the high priority item is a predetermined value positions at a higher position than the print medium of other groups, of the groups.

3. The non-transitory computer-readable medium according to claim 1, wherein
   the displaying includes displaying the selection screen in a state in which the grouped print medium is displayed in a predetermined order in group units.

4. The non-transitory computer-readable medium according to claim 1, wherein
   the computer-readable instructions further cause the processor to perform a step comprising:
      identifying the print medium mounted to the printer, and
   the displaying includes displaying the selection screen in a state in which the identified print medium is selected.

5. A non-transitory computer-readable medium storing computer-readable instructions that, when executed by a processor of an editing device configured to edit print data used by a printer, cause the processor to perform steps comprising:
   displaying a selection screen on a display portion, the selection screen including a list of a plurality of print medium to be selected, each of the print medium being identified by a combination of a plurality of items;
   determining a high priority item from among the plurality of items; and
   grouping the print medium, into groups, for which a value is shared for the high priority item determined from among the plurality of items,
      wherein the displaying includes displaying the selection screen in a state in which the grouped print medium is displayed in a grouped manner, based on the groups, on the list;
      wherein the displaying includes displaying, in the grouped manner, the selection screen in a state in which the grouped print medium is displayed in a predetermined order within each of the groups,
the predetermined order being based on width of the print medium;
wherein the computer-readable instructions further cause the processor to perform a step comprising:
acquiring a usage history from the printer, and
the determining includes determining the high priority item based on the print medium having a higher usage frequency, of the usage history acquired from the printer; and
wherein
the computer-readable instructions further cause the processor to perform steps comprising:
identifying three print medium, of the plurality of items, for which the usage frequency is highest, based on the acquired usage history; and
identifying the item, of the plurality of items, having the value shared by at least two print medium from among the identified three print medium, and
the determining includes determining the identified item having the shared value to be the high priority item.

6. An editing device configured to edit print data used by a printer, the editing device comprising:
a processor; and
a memory storing computer-readable instructions that, when executed by the processor, cause the processor to perform processes comprising:
displaying a selection screen on a display portion of the editing device, the selection screen including a list of a plurality of print medium to be selected, each of the print medium being identified by a combination of a plurality of items;
determining a high priority item from among the plurality of items; and
grouping the print medium, into groups, for which a value is shared for the high priority item determined from among the plurality of items,
wherein the displaying includes displaying the selection screen in a state in which the grouped print medium is displayed in a grouped manner, based on the groups, on the list;
wherein the displaying includes displaying, in the grouped manner, the selection screen in a state in which the grouped print medium is displayed in a predetermined order within each of the groups,
the predetermined order being based on width of the print medium; and
wherein the computer-readable instructions further cause the processor to perform a step comprising:
acquiring a usage history from the printer, and
the determining includes determining the high priority item based on the print medium having a higher usage frequency, of the usage history acquired from the printer; and
wherein the computer-readable instructions further cause the processor to perform steps comprising:
assigning a point, based on the acquired usage history, to a value of the plurality of items of the corresponding print medium, the point corresponding to the usage frequency and being attributed to each of the print medium; and
adding up the points assigned to the value shared among the plurality of items of the plurality of print medium, and
the determining includes determining the item relating to the value for which a total of the added up points is highest to be the high priority item.

7. The editing device according to claim 6, wherein
the computer-readable instructions further cause the processor to perform steps comprising:
identifying three print medium, of the plurality of items, for which the usage frequency is highest, based on the acquired usage history; and
identifying the item, of the plurality of items, having the value shared by at least two print medium from among the identified three print medium, and
the determining includes determining the identified item having the shared value to be the high priority item.

8. A method for controlling an editing device configured to edit print data used by a printer, the method comprising steps of:
determining a high priority item from among a plurality of items, a combination of the plurality of items identifying each of a plurality of print medium;
grouping the print medium, into groups, having a same value for the determined high priority item; and
displaying a selection screen on a display portion of the editing device, the selection screen including a list of the print medium to be selected, the grouped print medium being displayed in a grouped manner, based on the groups, on the list;
wherein the displaying includes displaying, in the grouped manner, the selection screen in a state in which the grouped print medium is displayed in a predetermined order within each of the groups,
the predetermined order being based on width of the print medium;
acquiring a usage history from the printer,
the determining includes determining the high priority item based on the print medium having a higher usage frequency, of the usage history acquired from the printer;
assigning a point, based on the acquired usage history, to a value of the plurality of items of the corresponding print medium, the point corresponding to the usage frequency and being attributed to each of the print medium; and
adding up the points assigned to the value shared among the plurality of items of the plurality of print medium, and
the determining includes determining the item relating to the value for which a total of the added up points is highest to be the high priority item.

9. A method for controlling an editing device configured to edit print data used by a printer, the method comprising steps of:
determining a high priority item from among a plurality of items, a combination of the plurality of items identifying each of a plurality of print medium;
grouping the print medium, into groups, having a same value for the determined high priority item; and
displaying a selection screen on a display portion of the editing device, the selection screen including a list of the print medium to be selected, the grouped print medium being displayed in a grouped manner, based on the groups, on the list;
wherein the displaying includes displaying, in the grouped manner, the selection screen in a state in which the grouped print medium is displayed in a predetermined order within each of the groups, the predetermined order being based on width of the print medium;
acquiring a usage history from the printer, and
the determining includes determining the high priority item based on the print medium having a higher usage frequency, of the usage history acquired from the printer;
identifying three print medium, of the plurality of items, for which the usage frequency is highest, based on the acquired usage history; and
identifying the item, of the plurality of items, having the value shared by at least two print medium from among the identified three print medium, and
the determining includes determining the identified item having the shared value to be the high priority item.

* * * * *